(12) United States Patent
Chen et al.

(10) Patent No.: US 11,320,697 B2
(45) Date of Patent: May 3, 2022

(54) DISPLAY DEVICE COMPRISING A BENDABLE LIGHT-TRANSMISSIVE LAYER AND MANUFACTURING METHOD THEREOF

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Yu Chen, Beijing (CN); Zhiyuan Wang, Beijing (CN); Ruilin Wang, Beijing (CN); Dingdong Song, Beijing (CN); Chao Yin, Beijing (CN); Run Gao, Beijing (CN); Wei Zeng, Beijing (CN); Mao Li, Beijing (CN); Linyu Jin, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 517 days.

(21) Appl. No.: 16/335,742

(22) PCT Filed: Sep. 3, 2018

(86) PCT No.: PCT/CN2018/103749
§ 371 (c)(1),
(2) Date: Mar. 22, 2019

(87) PCT Pub. No.: WO2019/100803
PCT Pub. Date: May 31, 2019

(65) Prior Publication Data
US 2021/0333640 A1    Oct. 28, 2021

(30) Foreign Application Priority Data

Nov. 27, 2017   (CN) .......................... 201711205957

(51) Int. Cl.
G02F 1/13357    (2006.01)
G02F 1/1335     (2006.01)

(52) U.S. Cl.
CPC .. *G02F 1/133608* (2013.01); *G02F 1/133531* (2021.01)

(58) Field of Classification Search
CPC ................... G02F 1/133608; G02F 1/133531
See application file for complete search history.

(56) References Cited

U.S. PATENT DOCUMENTS 9,632,358 B2 *   4/2017   Kim .................. G02F 1/133608
9,690,134 B2 *   6/2017   Kang ................ G02F 1/133308
(Continued)

FOREIGN PATENT DOCUMENTS

CN        103309063 A        9/2013
CN        204679739 U        9/2015
(Continued)

OTHER PUBLICATIONS

Search Report and Written Opinion for International Application No. PCT/CN2018/103749 dated Nov. 23, 2018.

*Primary Examiner* — Tracie Y Green
(74) *Attorney, Agent, or Firm* — Calfee, Halter & Griswold LLP

(57) ABSTRACT

Disclosed is a display device comprising a display panel, a backlight module and a bendable light-transmissive layer. The display panel comprises a light incident surface and a light exit surface opposite to each other and a plurality of panel sides connecting the light incident surface with the light exit surface. The backlight module is located on the light incident surface of the display panel and comprises a (Continued)

first surface facing the light incident surface, a second surface opposite to the first surface, and a plurality of module sides connecting the first surface with the second surface. The bendable light-transmissive layer at least partially covers the light exit surface of the display panel, the plurality of panel sides and the plurality of module sides to fix the display panel and the backlight module.

20 Claims, 5 Drawing Sheets

(56) References Cited

U.S. PATENT DOCUMENTS

| | | | |
|---|---|---|---|
| 10,775,655 B2 * | 9/2020 | Yoo | G02F 1/133308 |
| 2012/0133859 A1 | 5/2012 | Cha et al. | |
| 2013/0242483 A1 | 9/2013 | Hirasawa | |
| 2019/0079233 A1 | 3/2019 | Wang et al. | |

FOREIGN PATENT DOCUMENTS

| CN | 107340649 A | 11/2017 |
|---|---|---|
| CN | 107942562 A | 4/2018 |

* cited by examiner

DISPLAY DEVICE COMPRISING A BENDABLE LIGHT-TRANSMISSIVE LAYER AND MANUFACTURING METHOD THEREOF

CROSS REFERENCE TO RELATED APPLICATION(S)

The present application is the U.S. national phase entry of PCT/CN2018/103749 filed on Sep. 3, 2018, which claims the priority of the Chinese patent application No. 201711205957.X filed on Nov. 27, 2017, the entire disclosures of both are is incorporated herein by reference.

TECHNICAL FIELD

The present disclosure relates to the field of display technologies, and in particular to a display device and a manufacturing method thereof.

BACKGROUND ART

Display panels can be currently divided into self-luminous display panels and non-self-luminous display panels. Specifically, the self-luminous display panels can comprise organic light-emitting diode (OLED for short) display panels, quantum dot light emitting diode (QLED for short) display panels and so on. The non-self-luminous display panels can comprise liquid crystal display panels (LCD panels for short). Generally, a backlight module is installed behind a non-self-luminous display panel, so as to provide a light source for the display panel.

SUMMARY

According to an exemplary embodiment, a display device is provided. The display device comprises a display panel, a backlight module and a bendable light-transmissive layer. The display panel comprises a light incident surface and a light exit surface opposite to each other, and a plurality of panel sides connecting the light incident surface with the light exit surface. The backlight module is located on the light incident surface of the display panel, and comprises a first surface facing the light incident surface, a second surface opposite to the first surface, and a plurality of module sides connecting the first surface with the second surface. The bendable light-transmissive layer at least partially covers the light exit surface of the display panel, the plurality of panel sides and the plurality of module sides so as to fix the display panel and the backlight module.

According to a specific implementation, in the display device provided by an exemplary embodiment, the plurality of panel sides and the plurality of module sides form a plurality of device sides of the display device, and the bendable light-transmissive layer comprises a first layer structure located on the light exit surface of the display panel and a second layer structure attached onto at least two of the plurality of device sides.

According to a specific implementation, in the display device provided by an exemplary embodiment, the first layer structure comprises a polarizing structure.

According to a specific implementation, the display device provided by an exemplary embodiment further comprises a first polarizer attached onto the light incident surface of the display panel. Specifically, the first layer structure is located on a surface of the first polarizer facing away from the display panel.

According to a specific implementation, the display device provided by an exemplary embodiment further comprises a second polarizer attached onto the light exit surface of the display panel. Furthermore, the first layer structure is located on a surface of the second polarizer facing away from the display panel.

According to a specific implementation, in the display device provided by an exemplary embodiment, the first layer structure is attached onto the second polarizer via an optical adhesive, and the second layer structure is attached onto at least two of the plurality of device sides via an optical adhesive.

According to a specific implementation, in the display device provided by an exemplary embodiment, the second layer structure is further attached onto the second surface of the backlight module.

According to a specific implementation, in the display device provided by an exemplary embodiment, the backlight module comprises an optical film and a light guide plate stacked sequentially in a direction facing away from the display panel. Furthermore, the backlight module further comprises an outer frame covering the plurality of module sides and the second surface, wherein the second layer structure is attached onto the outer frame.

According to a specific implementation, in the display device provided by an exemplary embodiment, the second layer structure is attached onto two opposite device sides or all four device sides of the plurality of device sides.

According to a specific implementation, in the display device provided by an exemplary embodiment, the polarizing structure has a thickness of 60-120 μm.

According to a specific implementation, in the display device provided by an exemplary embodiment, the polarizing structure comprises a pressure sensitive adhesive, a first protective layer, a layer of polyvinyl alcohol and a second protective layer stacked sequentially in a direction facing away from the display panel.

According to a specific implementation, in the display device provided by an exemplary embodiment, the bendable light-transmissive layer has a thickness of 10-120 μm.

According to another exemplary embodiment, a manufacturing method for a display device is further provided. The manufacturing method comprises the steps of: providing a display panel, the display panel comprising a light incident surface and a light exit surface opposite to each other, and a plurality of panel sides connecting the light incident surface with the light exit surface; providing a bendable light-transmissive layer on the light exit surface of the display panel; providing a backlight module on the light incident surface of the display panel, the backlight module comprising a first surface facing the light incident surface, a second surface opposite to the first surface, and a plurality of module sides connecting the first surface with the second surface; and bending the bendable light-transmissive layer such that the bendable light-transmissive layer at least partially covers the light exit surface of the display panel, the plurality of panel sides and the plurality of module sides so as to fix the display panel and the backlight module.

According to a specific implementation, in the manufacturing method provided by an exemplary embodiment, the plurality of panel sides and the plurality of module sides form a plurality of device sides of the display device, and the bendable light-transmissive layer comprises a first layer structure located on the light exit surface of the display panel and a second layer structure attached onto at least two of the plurality of device sides. Furthermore, the step of providing a bendable light-transmissive layer on the light exit surface of the display panel comprises a sub-step of attaching the first layer structure onto the light exit surface of the display panel. Besides, the step of bending the bendable light-transmissive layer comprises a sub-step of bending the bendable light-transmissive layer such that the second layer structure is attached onto at least two of the plurality of device sides.

According to a specific implementation, the manufacturing method provided by an exemplary embodiment further comprises a step of attaching a first polarizer onto the light incident surface of the display panel before providing a backlight module.

According to a specific implementation, the manufacturing method provided by an exemplary embodiment further comprises a step of attaching a second polarizer onto the light exit surface of the display panel before providing a bendable light-transmissive layer. Besides, the plurality of panel sides and the plurality of module sides form a plurality of device sides of the display device, and the bendable light-transmissive layer comprises a first layer structure located on the light exit surface of the display panel and a second layer structure attached onto at least two of the plurality of device sides. Furthermore, the step of providing a bendable light-transmissive layer on the light exit surface of the display panel comprises a sub-step of attaching the first layer structure onto a surface of the second polarizer facing away from the display panel. Moreover, the step of bending the bendable light-transmissive layer comprises a sub-step of bending the bendable light-transmissive layer such that the second layer structure is attached onto at least two of the plurality of device sides.

DETAILED DESCRIPTION OF EMBODIMENTS

To render goals, technical solutions and advantages of the present disclosure clearer, exemplary embodiments of the present disclosure will be described in detail with reference to the drawings.

Usually, in a non-self-luminous display panel, the contact area of a sealant with a tape for bonding the display panel with the backlight module can be increased typically, so as to ensure the structural stability of display device. In this case, the sealant is apt to have a greater thickness, thereby resulting in a thicker bezel of the display device.

Figure 1:
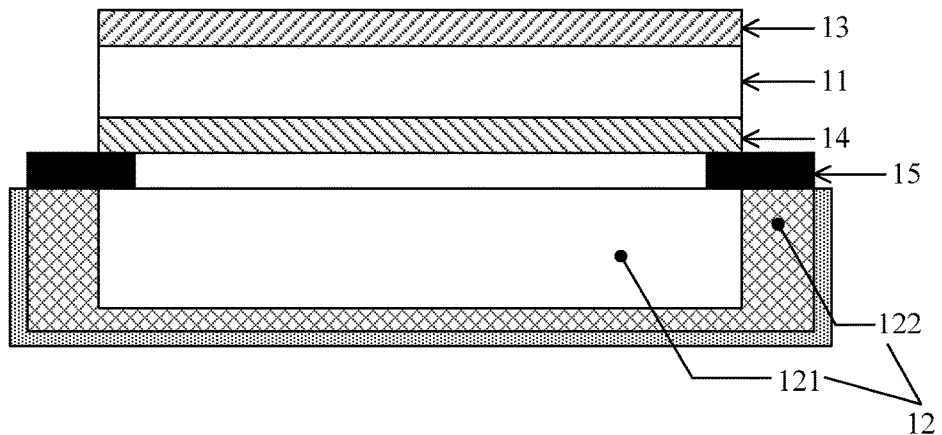
FIG. 1 is a schematic structure view of a display device in related techniques.

Referring to FIG. 1, a schematic structure view of a display device in related techniques is shown. As shown in FIG. 1, the display device can comprise a display panel 11 and a backlight module 12. Besides, an upper polarizer 13 is attached onto a light exit surface (i.e., the upper surface in the drawing) of the display panel 11, and a corresponding lower polarizer 14 is attached onto an opposite, light incident surface (i.e., the lower surface in the drawing). In order to install a backlight module 12 at the light incident side of the display panel 11, it is usually necessary to introduce a strip tape 15 on the backlight module 12, wherein one part of the strip tape 15 is located on a film 121 and the other part is on a sealant 122. In this way, the sealant 122 is bonded with the lower polarizer 14 via the strip tape 15, and thereby the goal of fixing the backlight module onto the light incident side of the display panel can be achieved.

However, in the above conventional solution, in order to increase the contact area of the strip tape with the sealant and thus ensure a good bonding effect, a greater thickness of sealant is generally required, which easily leads to a thicker bezel of the display device.

Therefore, an LCD display device generally comprises a display panel and a backlight module fixed on the light incident side of the display panel. As shown in FIG. 1, an upper polarizer 13 is attached onto a light exit surface of the display panel 11, and a lower polarizer 14 is attached onto an opposite, light incident surface. In order to install a backlight module at the light incident side of the display panel 11, it is usually necessary to introduce a strip tape 15 on the backlight module 12, wherein one part of the strip tape 15 is located on a film 121 and the other part is on a sealant 122. In this way, the sealant 122 is bonded with the lower polarizer 14 via the strip tape, which ensures that the backlight module is effectively fixed onto the light incident side of the display panel. As an example, the strip tape has a thickness of about 50 µm. However, in such a solution, in order to increase the contact area of the strip tape with the sealant of the backlight module and thus ensure the structural stability of the display device, the sealant is generally designed to have a greater thickness (e.g., 150-200 µm), which leads to a thicker bezel of the display device. For this reason, in the above LCD display device for example, in order to achieve a narrow-bezel design, the display panel and the backlight module can be connected and fixed by means of a hot melt adhesive. However, when the display panel and the backlight module are connected and fixed by means of a hot melt adhesive, the provision of corresponding devices and materials is required, which results in higher cost.

Figure 2:
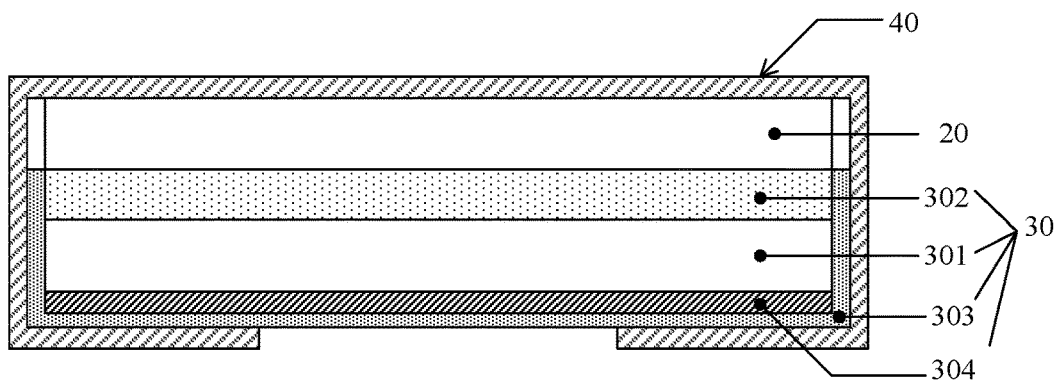
FIG. 2 is a schematic structure view of a display device according to an exemplary embodiment.

In order to solve one or more technical problems or defects as mentioned above, according to an aspect of the present disclosure, an exemplary embodiment provides a display device. As shown in FIG. 2, the display device can comprise a display panel 20, a backlight module 30 and a bendable light-transmissive layer 40. Specifically, the display panel 20 comprises a light incident surface (e.g., the lower surface in the drawing) and a light exit surface (e.g., the upper surface in the drawing) opposite to each other, and a plurality of panel sides (e.g., the left side and the right side in the drawing, and the other two sides not shown) connecting the light incident surface with the light exit surface. The backlight module 30 is located on the light incident surface (e.g., the lower surface in the drawing) of the display panel 20. Similarly, the backlight module 30 comprises a first surface (e.g., the upper surface) facing the lower surface of the display panel 20, a second surface (e.g., the lower surface) opposite to the first surface, and a plurality of module sides (e.g., the left side and the right side in the drawing, and the other two sides not shown) connecting the first surface with the second surface. Thereby, a side of the display panel 20 and a corresponding side of the backlight module 30 form a side of the display device. Furthermore, the bendable light-transmissive layer 40 is configured to at least partially cover the light exit surface (i.e., the upper surface) of the display panel 20, the plurality of panel sides and the plurality of module sides, so as to fix the display panel 20 and the backlight module 30. In other words, the bendable light-transmissive layer 40 at least covers the display panel 20 and the backlight module 30 from both above and side, thereby fixing them together.

Optionally, referring to FIG. 2, the backlight module 30 can specifically comprise a light guide plate 301 and an optical film 302 that are stacked over each other, wherein the optical film 302 is closer to the light incident surface of the display panel 20 than the light guide plate 301 is. Besides, the backlight module 30 further comprises an outer frame 303, wherein the outer frame 303 is arranged over the lower and side surfaces of the light guide plate 301 and the side surfaces of the optical film 302. As an example, the optical film 302 can comprise an upper prism film, a diffusion sheet and a lower prism film. Besides, between the outer frame 303 and the light guide plate 301 (e.g., the lower and side surfaces thereof), a sealant can be further arranged (not shown). In this case, since it is unnecessary to introduce a strip tape on the sealant for connecting the backlight module with the display panel, the sealant can have a smaller thickness. Obviously, alternatively, we can arrange no sealant at all between the outer frame 303 and the light guide plate 301.

Optionally, the outer frame can be an iron frame for protecting the internal structure of the backlight module.

Furthermore, referring to FIG. 2, on a surface of the light guide plate 301 facing away from the optical film 302, a reflective sheet 304 can be further provided.

It should be noted that the display panel can specifically comprise an array substrate, a color filter substrate and a liquid crystal layer located between the array substrate and the color filter substrate.

To sum up, exemplary embodiments provide a display device. In this display device, the bendable light-transmissive layer covers the display panel and the backlight module arranged on the light incident side of the display panel, at least from above and side, thereby achieving an effective fixation and connection between the display panel and the backlight module. As can be seen, fixation between the display panel and the backlight module can be achieved even without a sealant. Even if a sealant is used, the sealant can have a smaller thickness. Therefore, the bezel thickness of the backlight module and the display device is greatly reduced, and thereby a narrow bezel design of the display device is achieved.

Figure 3A:
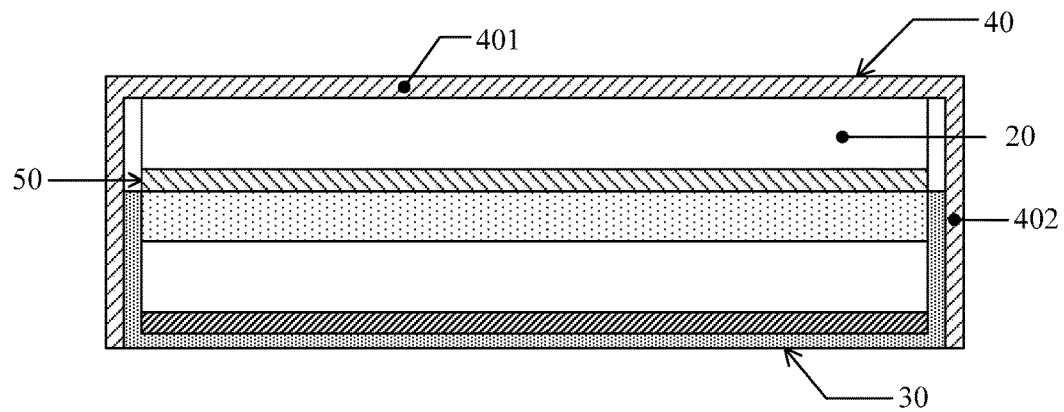
FIG. 3A is a schematic structure view of a display device according to an exemplary embodiment.

Optionally, as shown in FIG. 3A, the bendable light-transmissive layer 40 can comprise a first layer structure 401 disposed on the light exit surface (e.g., the upper surface in the drawing) of the display panel 20 and a second layer structure 402 covering at least two device sides of the entire display device. For example, the second layer structure 402 can be attached onto at least two sides of the backlight module 30 and correspondingly at least two panel sides.

In another exemplary embodiment, as shown in FIG. 3A, the first layer structure 401 can be a polarizing structure. In this case, since the first layer structure 401 is attached onto the light exit surface of the display panel 20, the polarizing structure can function as an upper polarizer. In other words, the first layer structure 401 of the bendable light-transmissive layer 40 is reused as an upper polarizer. Furthermore, referring to FIG. 3A, the display device can further comprise a lower polarizer 50, wherein the lower polarizer 50 is attached onto the light incident surface of the display panel 20. In this case, with the lower polarizer and the polarizing structure formed by the first layer structure 401, adjustment of light can be achieved collaboratively and thereby images displayed on the display device can be improved.

Exemplarily, the polarizing structure can comprise a pressure sensitive adhesive, a first protective layer, a layer of polyvinyl alcohol and a second protective layer stacked sequentially in a direction facing away from the display panel. Specifically, the first protective layer and the second protective layer are both used for supporting and protecting the layer of polyvinyl alcohol. As an example, the first protective layer and the second protective layer can be both a film of cellulose triacetate. In addition, the polarizing structure, in particular the polarizing region thereof, can be attached onto the light exit surface of the display panel by means of a pressure sensitive adhesive.

It should be noted that when the second layer structure is formed in the same manner, e.g., by comprising a pressure sensitive adhesive, the pressure sensitive adhesive will be located on a side close to the backlight module if it is bent towards the backlight module. Therefore, the second layer structure can be directly attached onto the backlight module. In other words, the second layer structure can be directly attached onto the outer frame of the backlight module, and no additional adhesive layer is required. This makes the process to be easier and more implementable.

Figure 3B:
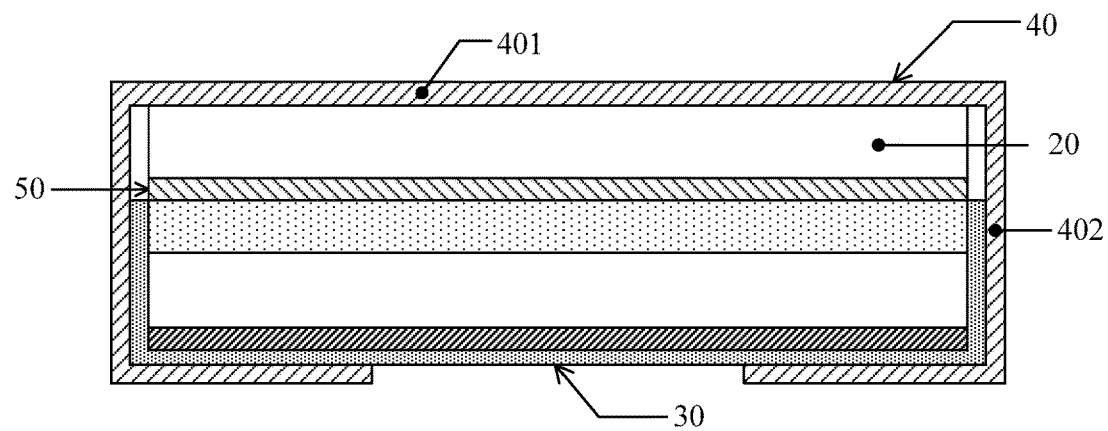
FIG. 3B is a schematic structure view of a display device according to an exemplary embodiment.

Furthermore, as shown in FIG. 3B, the second layer structure 402 can be further attached onto a bottom surface (i.e., the second surface) of the backlight module 30. The larger the contact area of the second layer structure 402 with the display panel 20 and the backlight module 30 is, the more stable the connection between the display panel 20 and the backlight module 30 will be. Correspondingly, the higher the structural stability of the display device will be.

Optionally, the polarizing structure can have a thickness of 60-120 μm.

As compared with a conventional structure of the display device in FIG. 1, in an exemplary embodiment, the upper polarizer is enlarged in dimension such that, in addition to the first layer structure located above, the upper polarizer further comprises a second layer structure attached onto the side surfaces of the display panel and the backlight module, and also onto the bottom surface of the backlight module. In this way, an effective connection between the display panel and the backlight module can be ensured, and meanwhile no new additional layer structure is required in the display device. This helps to obtain easier processes and higher implementability. Besides, as compared with the display device of FIG. 1, while the bezel thickness of the display device is reduced, the entire thickness of the display device is decreased due to the omission of strip tape.

Figure 4A:
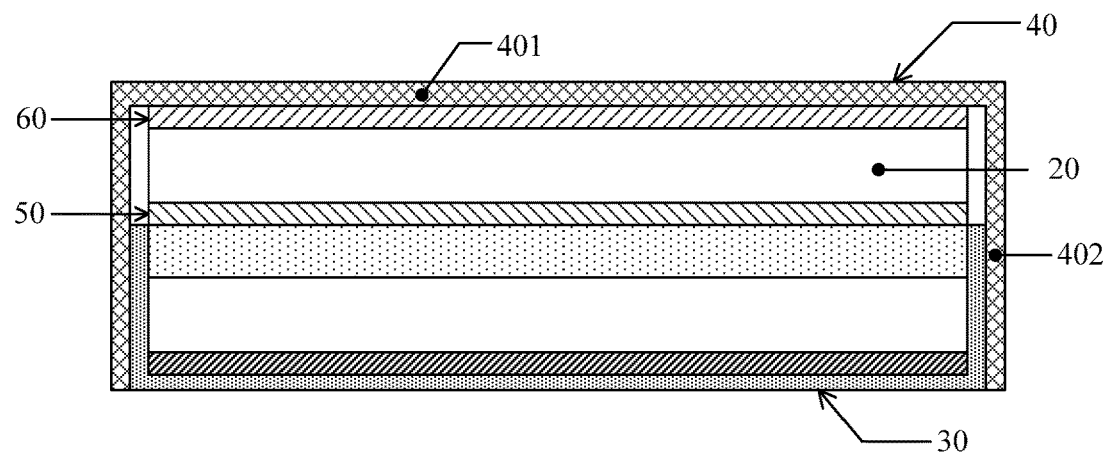
FIG. 4A is a schematic structure view of a display device according to an exemplary embodiment.

In another exemplary embodiment, as shown in FIG. 4A, the display device can further comprise an upper polarizer 60 attached onto the light exit surface of the display panel 20, wherein the first layer structure 401 is arranged on a surface of the upper polarizer 60 facing away from the display panel 20. Furthermore, referring to FIG. 4A, the display device can further comprise a lower polarizer 50, wherein the lower polarizer 50 is attached onto the light incident surface of the display panel 20. In this case, with an collaborative adjustment of light by the lower polarizer and the upper polarizer, images displayed on the display device can be improved.

Optionally, the first layer structure 401 can be attached onto the upper polarizer 60 by means of an optical adhesive. Similarly, the second layer structure 402 can also be attached onto the side surfaces of the backlight module 30 by means of an optical adhesive.

Figure 4B:
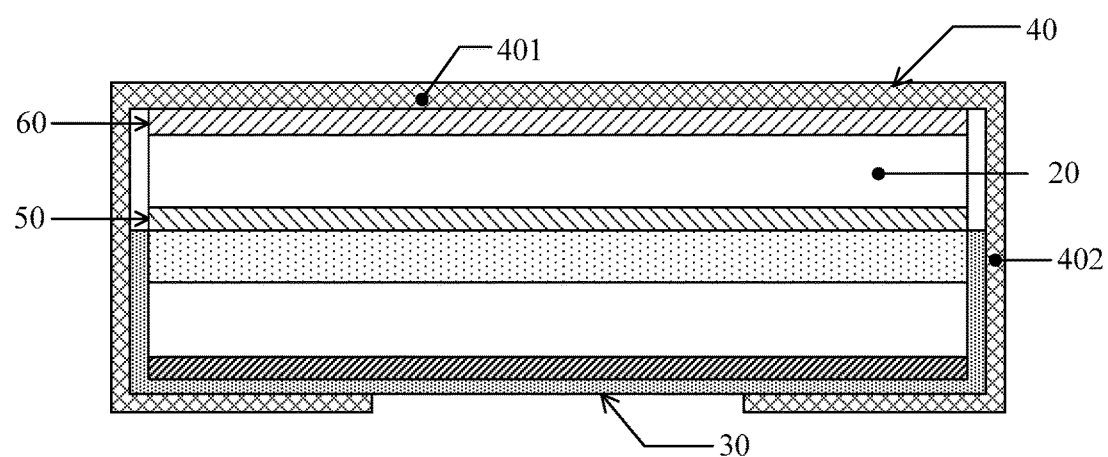
FIG. 4B is a schematic structure view of a display device according to an exemplary embodiment.

Furthermore, as shown in FIG. 4B, the second layer structure 402 can be further attached onto a bottom surface (i.e., the second surface) of the backlight module 30. The larger the contact area of the second layer structure with the display panel and the backlight module is, the more stable the connection between the display panel and the backlight module will be. Correspondingly, the higher the structural stability of the display device will be.

Optionally, the bendable light-transmissive layer can have a thickness of 10-20 μm. The bendable light-transmissive layer can be made of the transparent polyethylene terephthalate (PET for short) (which is also called polyester resin). A PET material has advantages such as rubbing resistance and high dimension stability. Therefore, when the display panel and the backlight module are connected by a PET material, the resultant connection has a higher stability.

As compared with a conventional structure of the display device in FIG. 1, in an embodiment of the present disclosure, by arranging a new layer, i.e., a bendable light-transmissive layer, on the upper polarizer, and attaching the second layer structure of the bendable light-transmissive layer onto the side surfaces of the display panel and the backlight module and also onto the bottom surface of the backlight module, a reliable connection between the display panel and the backlight module is obtained. Besides, since the thickness of the bendable light-transmissive layer is smaller than that of a conventional polarizer, as compared with the previous embodiment, the bezel thickness of the display device can be further reduced, and the implementation can also be easier.

Optionally, the second layer structure can be located on two opposite ends of the first layer structure. In other words, the second layer structure can be located on two opposite side surfaces of the display device. Alternatively, the second layer structure can be further arranged to surround the first layer structure. In other words, the second layer structure can be disposed on all four side surfaces of the display device. That is, the bendable light-transmissive layer can comprise a first layer structure and a second layer structure located on two opposite ends of the first layer structure. Alternatively, the bendable light-transmissive layer can comprise a first layer structure and a second layer structure located around the first layer structure. When a second layer structure arranged on two opposite ends of the first layer structure is attached onto the backlight module, the bendable light-transmissive layer can fix the display panel and the backlight module more stably. When a second layer structure arranged around the first layer structure is attached onto the backlight module, the connection stability between the display panel and the backlight module can be further improved.

Figure 5A:
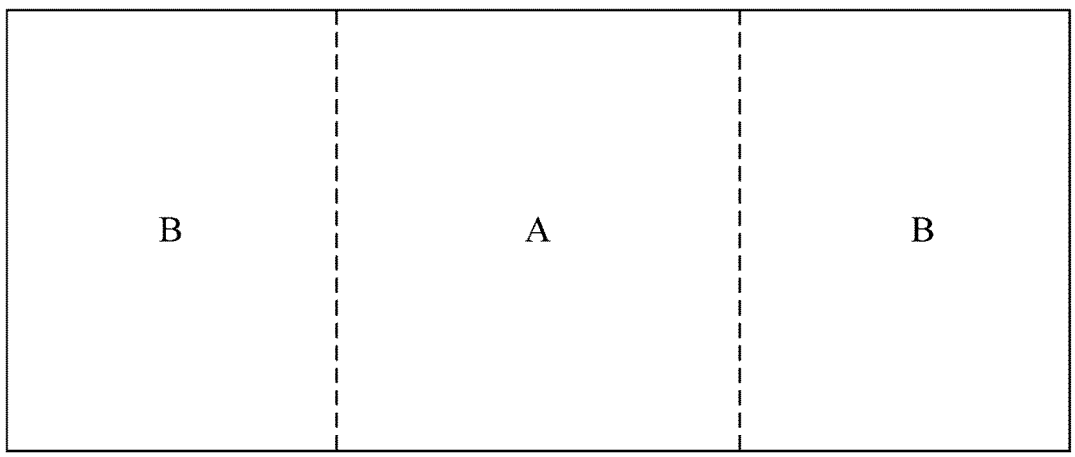
FIG. 5A is a schematic structure view of a bendable light-transmissive layer according to an exemplary embodiment.
Figure 5B:
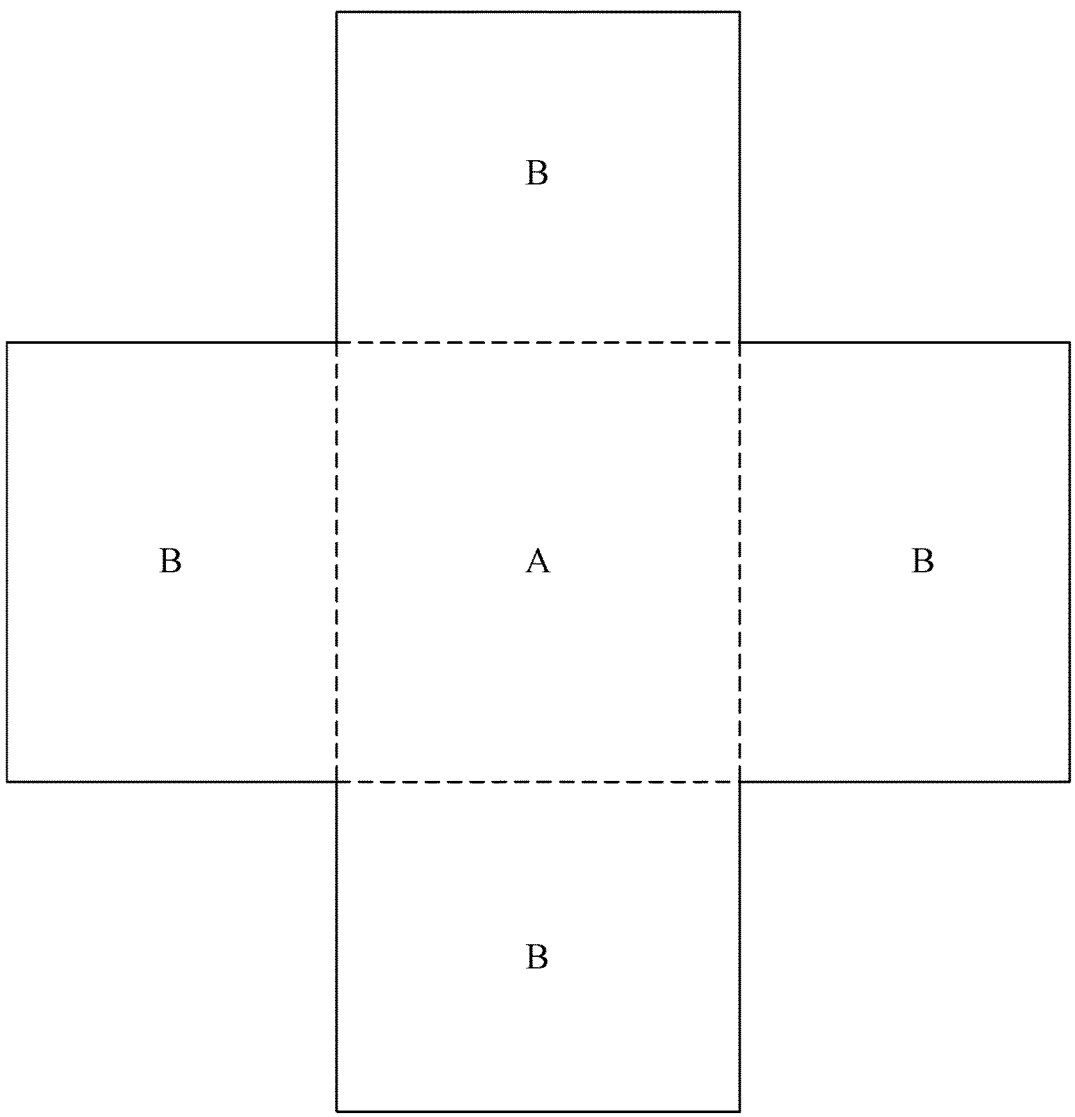
FIG. 5B is a schematic structure view of a bendable light-transmissive layer according to an exemplary embodiment.

Exemplarily, FIG. 5A is a schematic structure view of a bendable light-transmissive layer. As shown in FIG. 5A, the bendable light-transmissive layer can comprise a first layer structure A and a second layer structure B located on two opposite ends of the first layer structure A. FIG. 5B is a schematic structure view of another bendable light-transmissive layer. As shown in FIG. 5B, the bendable light-transmissive layer can comprise a first layer structure A and a second layer structure B located around the first layer structure A. After the backlight module is disposed at the light incident side of the display panel, the bendable light-transmissive layer can be bent by using a simple and semi-manual tool, so as to attach the second layer structure onto the backlight module.

Furthermore, the display device can further comprise a transparent cover plate arranged on the first layer structure of the bendable light-transmissive layer. As an example, the transparent cover plate can be attached onto the first layer structure of the bendable light-transmissive layer by an optical adhesive. For example, the transparent cover plate can be a glass cover plate.

In specific implementations, the display device provided by embodiments of the present disclosure can be any product or component having a display function, such as a cellphone, a tablet computer, a television, a display, a notebook computer, a digital photo frame, a navigator or the like.

To sum up, exemplary embodiments provide a display device. In this display device, the bendable light-transmissive layer covers the display panel and the backlight module arranged on the light incident side of the display panel at least from above and side, thereby achieving an effective fixation and connection between the display panel and the backlight module. As can be seen, the fixation between the display panel and the backlight module can be achieved even without a sealant. Even if a sealant is used, the sealant can have a smaller thickness. Therefore, the bezel thickness of the backlight module and the display device is greatly reduced, and thereby a narrow bezel design of the display device is achieved.

Figure 6:
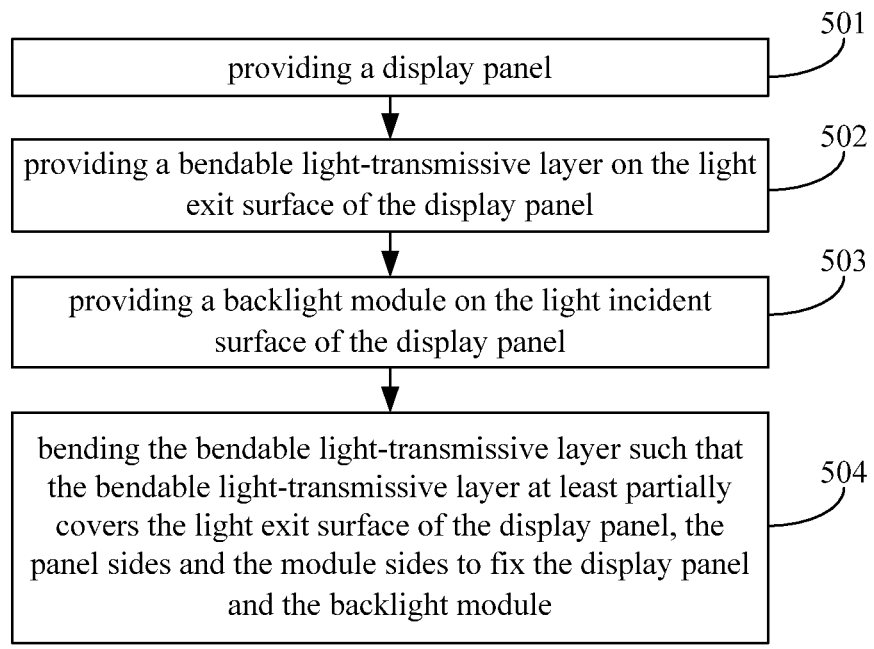
FIG. 6 is a flow chart illustrating a manufacturing method for a display device according to an exemplary embodiment.

According to another aspect of the present disclosure, an exemplary embodiment further provides a manufacturing method for a display device. As shown in FIG. 6, the manufacturing method comprises steps as follows.

Step 501, providing a display panel. Specifically, the display panel comprises a light incident surface and a light exit surface opposite to each other, and a plurality of panel sides connecting the light incident surface with the light exit surface.

Step 502, providing a bendable light-transmissive layer on the light exit surface of the display panel.

Step 503, providing a backlight module on the light incident surface of the display panel. Specifically, the backlight module comprises a first surface facing the light incident surface, a second surface opposite to the first surface, and a plurality of module sides connecting the first surface with the second surface.

Step 504, bending the bendable light-transmissive layer such that the bendable light-transmissive layer at least partially covers the light exit surface of the display panel, the plurality of panel sides and the plurality of module sides, so as to fix the display panel and the backlight module.

To sum up, exemplary embodiments further provide a manufacturing method for a display device. Specifically, by bending the bendable light-transmissive layer, the bendable light-transmissive layer is enabled to cover the display panel and the backlight module arranged on the light incident side of the display panel at least from above and from side, thereby achieving an effective fixation and connection between the display panel and the backlight module. As can be seen, the fixation between the display panel and the backlight module can be achieved even without a sealant. Even if a sealant is used, such a sealant can have a smaller thickness. Therefore, the thickness bezel of the backlight module and the display device is greatly reduced, and thereby a narrow bezel design of the display device is achieved.

Figure 7:
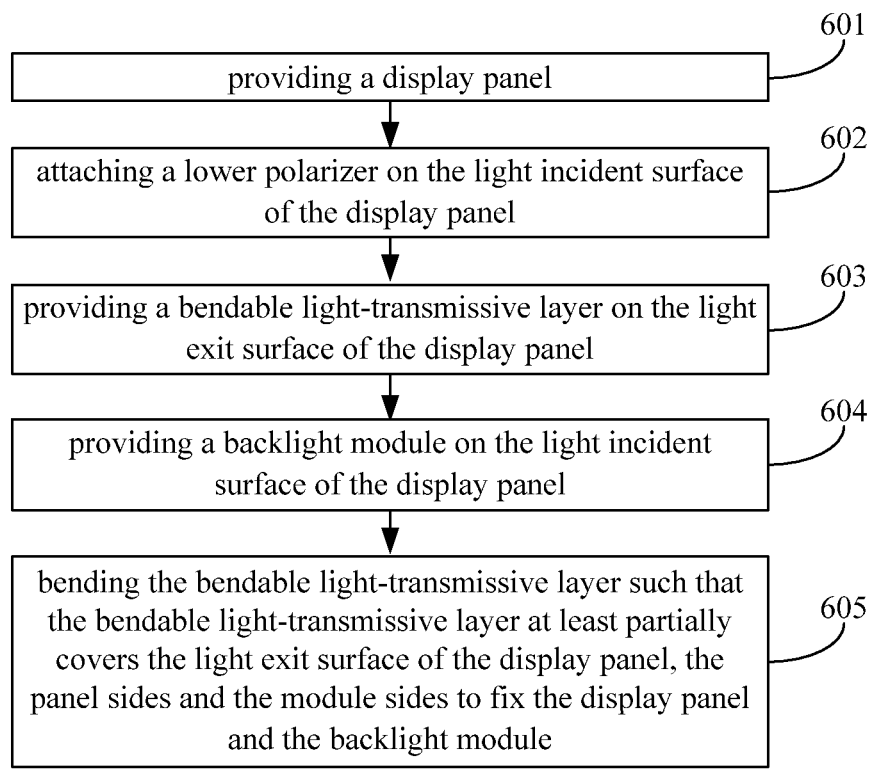
FIG. 7 is a flow chart illustrating a manufacturing method for a display device according to an exemplary embodiment.

In another exemplary embodiment, a manufacturing method for a display device is provided, which can be used for manufacturing the display device as shown in FIG. 3A or 3B. As shown in FIG. 7, the method comprises steps as follows.

Step 601, providing a display panel.

Specifically, the display panel can comprise an array substrate, a color filter substrate, and a liquid crystal layer located between the array substrate and the color filter substrate.

Step 602, attaching a lower polarizer on the light incident surface of the display panel.

Step 603, providing a bendable light-transmissive layer on the light exit surface of the display panel.

Optionally, the bendable light-transmissive layer can be a profiled polarizer for example, wherein the profiled polarizer comprises a first layer structure and a second layer structure located on at least two ends of the first layer structure. The step of providing a bendable light-transmissive layer on the light exit surface of the display panel can comprise a sub-step of attaching the first layer structure onto the light exit surface of the display panel.

As an example, the first layer structure can be a polarizing structure. In this case, with a collaborative adjustment of light by the lower polarizer and the polarizing structure, the display device can display pictures normally.

Step 604, providing a backlight module on the light incident surface of the display panel. Specifically, the backlight module comprises a first surface facing the light incident surface, a second surface opposite to the first surface, and a plurality of module sides connecting the first surface with the second surface.

Step 605, bending the bendable light-transmissive layer such that the bendable light-transmissive layer at least partially covers the light exit surface of the display panel, the plurality of panel sides and the plurality of module sides, so as to fix the display panel and the backlight module.

When the bendable light-transmissive layer is a profiled polarizer, correspondingly, the step of bending the bendable light-transmissive layer such that the bendable light-transmissive layer covers the display panel and the backlight module at least from above and from side can comprises a sub-step of bending the profiled polarizer such that the second layer structure is attached onto the side surfaces of the display surface and the backlight module.

Furthermore, after the display panel and the backlight module are fixed, it is necessary to do a performance test of the display device, including test for structural stability of the display device for example.

Figure 8:
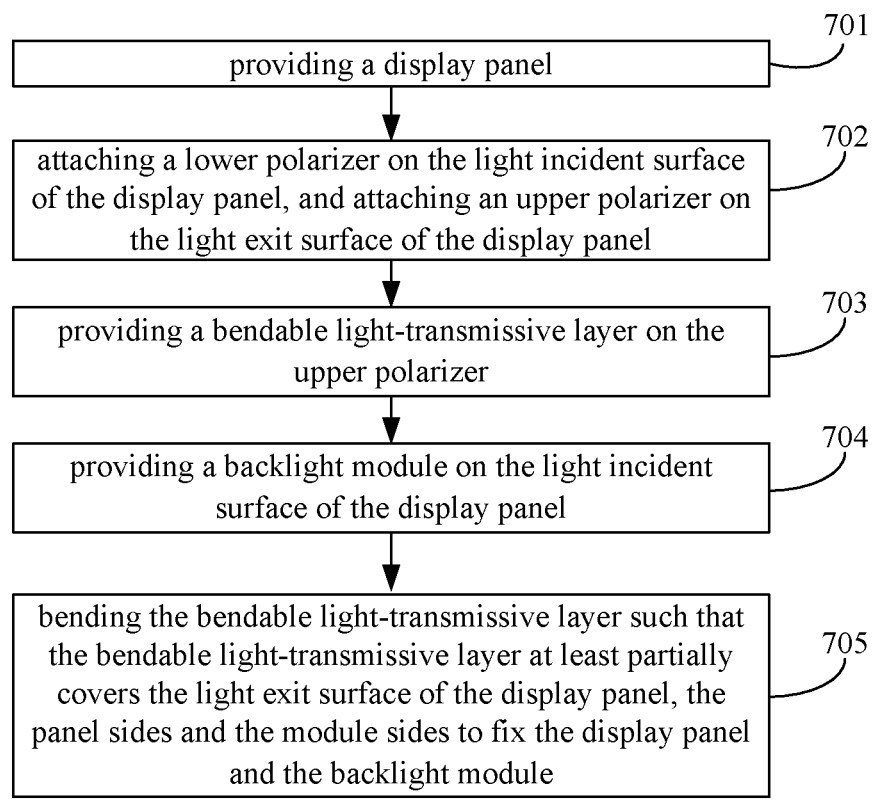
FIG. 8 is a flow chart illustrating a manufacturing method for a display device according to an exemplary embodiment.

In another exemplary embodiment, a manufacturing method for a display device is provided, which can be used for manufacturing the display device as shown in FIG. 4A or 4B. As shown in FIG. 8, the manufacturing method can comprise steps as follows.

Step 701, providing a display panel.

As an example, the display panel can comprise an array substrate, a color filter substrate, and a liquid crystal layer located between the array substrate and the color filter substrate.

Step 702, attaching a lower polarizer onto the light incident surface of the display panel, and attaching an upper polarizer onto the light exit surface of the display panel.

In this way, with a collaborative adjustment of light by the lower polarizer and the upper polarizer, the display device can display pictures normally.

Step 703, providing a bendable light-transmissive layer on the upper polarizer.

The bendable light-transmissive layer comprises a first layer structure and a second layer structure located on at least two ends of the first layer structure. Exemplarily, the step of providing a bendable light-transmissive layer on the upper polarizer can comprise a sub-step of providing the first layer structure on a surface of the upper polarizer facing away from the display panel.

Optionally, the first layer structure can be attached onto the upper polarizer by an optical adhesive.

Step 704, providing a backlight module on the light incident surface of the display panel. Specifically, the backlight module comprises a first surface facing the light incident surface, a second surface opposite to the first surface, and a plurality of module sides connecting the first surface with the second surface.

Step 705, bending the bendable light-transmissive layer such that the bendable light-transmissive layer at least partially covers the light exit surface of the display panel, the plurality of panel sides and the plurality of module sides, so as to fix the display panel and the backlight module.

Correspondingly, the step of bending the bendable light-transmissive layer can comprise a sub-step of bending the bendable light-transmissive layer such that the second layer structure is attached onto the side surfaces of the display panel and the backlight module.

Optionally, the second layer structure can be attached onto the side surfaces of the backlight module by an optical adhesive.

Furthermore, after the display panel and the backlight module are fixed, it is necessary to do a performance test of the display device, including test for structural stability of the display device for example.

It should be noted that in the manufacturing method for a display device provided by exemplary embodiment, the sequence of steps can be suitably adjusted, and the steps can be correspondingly increased or decreased if necessary. Any variation easily conceivable within the technical scope as disclosed in the present disclosure for a skilled person who is familiar with this technical field shall fall within the protection scope of the present disclosure, which will not be repeated herein for simplicity.

To sum up, exemplary embodiments further provide a manufacturing method for a display device. In the manufacturing method, by bending the bendable light-transmissive layer, the bendable light-transmissive layer is enabled to cover the display panel and the backlight module arranged on the light incident side of the display panel at least from above and side, thereby achieving an effective fixation and connection between the display panel and the backlight module. Thereby, the fixation between the display panel and the backlight module can be achieved even without a sealant. Besides, even if a sealant is used, such a sealant can have a smaller thickness. In this way, the bezel thickness of the backlight module and the display device is greatly reduced, which helps to achieve a narrow bezel design of the display device.

As for the method in the above exemplary embodiments, each structure of the display device involved therein has been described in detail in the embodiments of the device, which will not be illustrated in detail herein.

What is mentioned above is only exemplary embodiments of the present disclosure and cannot limit the present disclosure. Any amendment, equivalent replacement, and improvement made within the spirit and principle of the present disclosure should fall within the protection scope of the present disclosure.

The invention claimed is:

1. A display device, comprising a display panel, a backlight module and a bendable light-transmissive layer, wherein
the display panel comprises a light incident surface and a light exit surface opposite to each other, and a plurality of panel sides connecting the light incident surface with the light exit surface,
the backlight module is located on the light incident surface of the display panel, and comprises a first surface facing the light incident surface, a second surface opposite to the first surface, and a plurality of module sides connecting the first surface with the second surface, the backlight module comprises an optical film, a light guide plate and an outer frame stacked sequentially in a direction facing away from the display panel, and the outer frame covers the second surface of the backlight module and side surfaces of the optical film and the light guide plate, and
the bendable light-transmissive layer at least partially covers the light exit surface of the display panel, the plurality of panel sides and the plurality of module sides to fix the display panel and the backlight module, and an orthographic projection of the light exit surface of the display panel on the light incident surface of the display panel falls within an orthographic projection of the bendable light-transmissive layer on the light incident surface of the display panel.

2. The display device according to claim 1, wherein
the plurality of panel sides and the plurality of module sides form a plurality of device sides of the display device, and
the bendable light-transmissive layer comprises a first layer structure located on the light exit surface of the display panel and a second layer structure attached onto at least two of the plurality of device sides.

3. The display device according to claim 2, wherein
the first layer structure comprises a polarizing structure.

4. The display device according to claim 3, further comprises:
a first polarizer attached onto the light incident surface of the display panel, wherein the first layer structure is located on a surface of the first polarizer facing away from the display panel.

5. The display device according to claim 2, further comprises:
a second polarizer attached onto the light exit surface of the display panel, wherein the first layer structure is located on a surface of the second polarizer facing away from the display panel.

6. The display device according to claim 5, wherein
the first layer structure is attached onto the second polarizer by an optical adhesive, and
the second layer structure is attached onto at least two of the plurality of device sides by an optical adhesive.

7. The display device according to claim 2, wherein
the second layer structure is further attached onto the second surface of the backlight module.

8. The display device according to claim 2, wherein
the outer frame covers the plurality of module sides and the second surface, and the second layer structure is attached onto the outer frame.

9. The display device according to claim 2, wherein
the second layer structure is attached onto two opposite device sides or all four device sides of the plurality of device sides.

10. The display device according to claim 3, wherein
the polarizing structure has a thickness of 60-120 μm.

11. The display device according to claim 3, wherein
the polarizing structure comprises a pressure sensitive adhesive, a first protective layer, a layer of polyvinyl alcohol and a second protective layer stacked sequentially in a direction facing away from the display panel.

12. The display device according to claim 2, wherein
the bendable light-transmissive layer has a thickness of 10-20 μm.

13. A manufacturing method for a display device, comprising steps of:
providing a display panel, the display panel comprising a light incident surface and a light exit surface opposite to each other, and a plurality of panel sides connecting the light incident surface with the light exit surface;
providing a bendable light-transmissive layer on the light exit surface of the display panel;
providing a backlight module on the light incident surface of the display panel, the backlight module comprising a first surface facing the light incident surface, a second surface opposite to the first surface, and a plurality of module sides connecting the first surface with the second surface, the backlight module comprising an optical film, a light guide plate and an outer frame stacked sequentially in a direction facing away from the display panel, and the outer frame covering the second surface of the backlight module and side surfaces of the optical film and the light guide plate; and
bending the bendable light-transmissive layer such that the bendable light-transmissive layer at least partially covers the light exit surface of the display panel, the plurality of panel sides and the plurality of module sides to fix the display panel and the backlight module, wherein an orthographic projection of the light exit surface of the display panel on the light incident surface of the display panel falls within an orthographic projection of the bendable light-transmissive layer on the light incident surface of the display panel.

14. The method according to claim 13, wherein
the plurality of panel sides and the plurality of module sides form a plurality of device sides of the display device, and the bendable light-transmissive layer comprises a first layer structure located on the light exit surface of the display panel and a second layer structure attached onto at least two of the plurality of device sides;
the step of providing a bendable light-transmissive layer on the light exit surface of the display panel comprises a sub-step of attaching the first layer structure onto the light exit surface of the display panel; and
the step of bending the bendable light-transmissive layer comprises a sub-step of bending the bendable light-transmissive layer such that the second layer structure is attached onto at least two of the plurality of device sides.

15. The method according to claim 13, further comprising:
attaching a first polarizer onto the light incident surface of the display panel before providing a backlight module.

16. The method according to claim 13, further comprising: attaching a second polarizer onto the light exit surface of the display panel before providing a bendable light-transmissive layer; and the plurality of panel sides and the plurality of module sides form a plurality of device sides of the display device, and the bendable light-transmissive layer comprises a first layer structure located on the light exit surface of the display panel and a second layer structure attached onto at least two of the plurality of device sides;

the step of providing a bendable light-transmissive layer on the light exit surface of the display panel comprises a sub-step of attaching the first layer structure onto a surface of the second polarizer facing away from the display panel; and the step of bending the bendable light-transmissive layer comprises a sub-step of bending the bendable light-transmissive layer such that the second layer structure is attached onto at least two of the plurality of device sides.

17. The display device according to claim 3, wherein the second layer structure is further attached onto the second surface of the backlight module.

18. The display device according to claim 3, wherein:
the outer frame covers the plurality of module sides and the second surface, and the second layer structure is attached onto the outer frame.

19. The display device according to claim 3, wherein
the second layer structure is attached onto two opposite device sides or all four device sides of the plurality of device sides.

20. The display device according to claim 3, wherein
the bendable light-transmissive layer has a thickness of 10-20 μm.

* * * * *